United States Patent [19]

Nakayama et al.

[11] Patent Number: 4,593,067
[45] Date of Patent: Jun. 3, 1986

[54] LOW SHRINKABLE UNSATURATED POLYESTER RESIN COMPOSITION

[75] Inventors: Masaharu Nakayama, Nagoya; Kyosuke Fukushi, Kuwana; Yasuo Moriya; Nobuyoshi Suzuki, both of Chita, all of Japan

[73] Assignee: Nippon Oil and Fats Co., Tokyo, Japan

[21] Appl. No.: 686,145

[22] Filed: Dec. 26, 1984

[30] Foreign Application Priority Data

Dec. 28, 1983 [JP] Japan ................ 58-248289

[51] Int. Cl.$^4$ ............................... C08L 67/06
[52] U.S. Cl. .................... 525/92; 525/170; 525/299
[58] Field of Search .............. 525/92, 299, 170

[56] References Cited

U.S. PATENT DOCUMENTS 3,992,479 11/1976 Roberts .................. 525/92
4,303,762 12/1981 Nakayama ............. 525/299
4,374,215  2/1983 Atkins .................. 523/514

Primary Examiner—John C. Bleutge
Assistant Examiner—Patricia Short
Attorney, Agent, or Firm—Parkhurst & Oliff

[57] ABSTRACT

Disclosed herein is a low shrinkable unsaturated polyester resin composition consisting of (A) 20–70% by weight of an unsaturated polyester, (B) 28–60% by weight of a monomer polymerizable with the above unsaturated polyester, and (C) 2–20% by weight of a block copolymer mixture. The mixtures of the monomer (B) and the block copolymer mixture (C), and a mixture of the polyester (A), the monomer (B), and the block copolymer mixture (C) are in a non-aqueous dispersion state. The block copolymer mixture is obtained by polymerizing either one of the monomers defined below in (a) and (b) with a polymerization initiator a polymeric peroxide represented by the formula:

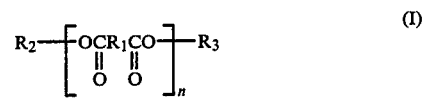

in which $R_1$ represents a divalent branched hydrocarbon group having 10–30 carbons, and $R_2$ and $R_3$ represent a hydrogen atom, a hydroxyl group or an alkali metal, and the average polymerization degree n is 2–40, and is used to obtain a first polymer having peroxy bonds in its molecule, and block-polymerizing the first polymer with the remaining monomer (a) or (b) which has not been used in the first polymerization reaction wherein, (a) is a monomer or a monomer mixture consisting of 70–100% by weight of styrene monomer and 30–0% by weight of a monomer polymerizable therewith.

(b) is a monomer or a mixture of monomers consisting of 70–100% by weight of $C_{1-4}$ alkyl ester of acrylic acid or methacrylic acid and 0–30% by weight of a monomer polymerizable therewith.

8 Claims, No Drawings

LOW SHRINKABLE UNSATURATED POLYESTER RESIN COMPOSITION

BACKGROUND OF THE INVENTION (1) Field of the Invention

The present invention relates to a low shrinkable unsaturated polyester resin composition excellent in the low shrinkable property in cold curing.

(2) Description of the Prior Art

In general, the curing molding of the unsaturated polyester resin is obtained by using an organic peroxide such as benzoylperoxide, methylethyl ketone peroxide or the like as a polymerization catalyst, and if necessary, an organic metal salt such as cobalt naphthenate, cobalt octenate or the like as a polymerization promoter according to the contact pressure molding method such as the hand lay-up method, the cold press method or the resin injection method utilizing the reaction heat generated when the unsaturated polyester resin is cured with the use of a relatively low pressure press or press-in machine, the cold molding method in the case of a resin mortar, resin concrete and the like, or the heating molding method using the composition for molding such as the sheet molding compound (SMC), the bulk molding compound (BMC) and the like.

However, since the cure shrinkage of the unsaturated polyester resin is as much as about 5-12% by volume, the occurrence of various defects such as strength reduction, cracking, warping, surface contamination and the like resulting from the cure shrinkage could not be prevented by adopting any of the above molding methods.

As the method for reducing the above cure shrinkage of the unsaturated polyester resin, there has been employed a method in which the thermoplastic resin such as polystyrene, polymethylmethacrylate, polyvinyl acetate or the like is compounded into the unsaturated polyester resin, and it is widely known that the shrink-resistant effect can be produced to some extent by such a method.

However, there remains unsolved the fundamentally serious defect. That is, in order to make the general thermoplastic resin to exhibit the effect as the shrink-resistant agent to reduce the cure shrinkage of the unsaturated polyester resin, it is always necessary that the molding temperature be considerably high in cure molding. For this reason, there exists no effective shrink-resistant agent for a method other than the heating molding method. Further, the general thermoplastic resin has a poor dispersion stability into the unsaturated polyester resin, so that it is raised from the unsaturated polyester resin molding on the midway of the curing, and the application field is restricted due to roughness of the surface of the cured product, cure insufficiency, ununiformity in the cure shrinkage, strength reduction and so on.

After the present inventors had made strenuous studies to solve the above defects, they found that when copolymer containing mainly of a block copolymer (hereinafter referred to as "a block copolymer mixture") which is composed of vinyl acetate and styrene segment either one of which is bound with an acidic group is added to the unsaturated polyester resin when the unsaturated polyester resin is cured, excellent shrink-resistant effect can be conferred upon the unsaturated polyester resin cured product, and they have filed a patent application therefor under an application No. 48,769/1981 (Japanese Patent Application Laid-Open No. 164,114/1982). Although this method is satisfactory in the molding under heating, it is not satisfactory in the cold curing.

SUMMARY OF THE INVENTION

Upon having made studies to provide a block copolymer mixture which is stably dispersed into the unsaturated polyester resin and develops the sufficient shrink-resistant effect in the case of the cold curing, the present inventors have found that the below-mentioned block copolymer mixture has a high blocking efficiency of 70-90% by weight in the production thereof, the non-aqueous dispersion resin composition containing this block copolymer mixture exhibits an extremely excellent dispersion stability, and the composition in which the block copolymer mixture is compounded into the unsaturated polyester resin has an excellent shrink-resistant effect in the cold curing, and accordingly accomplished the invention.

That is, the present invention relates to a low shrinkage unsaturated polyester resin composition consisting of (A) 20-70% by weight of an unsaturated polyester; (B) 28-60% by weight of a monomer polymerizable with the above unsaturated polyester; (C) 2-20% by weight of a block copolymer mixture defined in the following, and in which a mixture of the monomer (B) and the block copolymer mixture (C) is in a non-aqueous dispersion state; and a mixture of the above polyester (A), the monomer (B) and the block copolymer mixture (C) is in a non-aqueous dispersion state.

The above-mentioned block copolymer mixture is a copolymer obtained by polymerizing either one of monomers defined below in (a) and (b) (hereinafter referred to as monomer (a) and monomer (b) respectively) by using as a polymerization initiator a polymeric peroxide represented by the general formula:

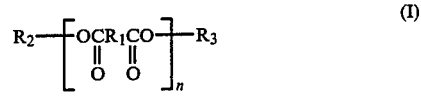

$$R_2 - \left[ OCR_1CO \atop \| \quad \| \atop O \quad O \right]_n R_3 \quad (I)$$

in which $R_1$ represents a divalent branched hydrocarbon group having 10-30 carbons, and $R_2$ and $R_3$ represent a hydrogen atom, a hydroxyl group or an alkali metal; and the average polymerization degree n is 2-40, and it is used to obtain a polymer (a first polymerization reaction) having peroxy bonds in its molecule, and block-polymerizing this polymer with a second monomer or a mixture of the remaining monomers (a) or (b) which have not been used in the first polymerization reaction.

(a) A monomer or a monomer mixture consisting of 70-100% by weight of styrene monomer and 30-0% by weight of a monomer polymerizable therewith (b) A monomer or a mixture of monomers consisting of 70-100% by weight of a $C_{1-4}$ alkyl ester of acrylic acid or methacrylic acid and 30-0% by weight of a monomer polymerizable therewith selected from the group consisting of $C_{5-18}$ alkyl ester of acrylic acid and methacrylic acid, acrylic acid, and methacrylic acid.

These and other objects, features and advantages of the present invention will be appreciated upon reading of the invention with understanding that some modifications, variations and changes of the invention could be easily done by one skilled in the art to which the invention pertains without departing from the spirit of the invention or the scope of the appended claims.

DETAILED DESCRIPTION OF THE INVENTION

The unsaturated polyester (A) used in the present invention may be produced from an α,β-unsaturated dibasic acid, a saturated dibasic acid, a glycol or the like. As the α,β-unsaturated dibasic acid, mention may be made of maleic anhydride, maleic acid, fumaric acid, mesaconic acid, tetraconic acid, itaconic acid, chlorinated maleic acid and alkyl esters thereof. As the saturated dibasic acid, mention may be made of phthalic anhydride, phthalic acid, isophthalic acid, tetraphthalic acid, tetrahydrophthalic acid, halogenated phthalic anhydride, adipic acid, succinic acid, sebasic acid, alkyl esters thereof and the like. As the glycol, mention may be made of ethylene glycol, diethylene glycol propylene glycol, dipropylene glycol, butylene glycol, neopentyl glycol, hexylene glycol, hydrogenated bisphenol A, 2,2'-di(4-hydropropoxyphenyl)propane, 2,2'-di(4-hydroxyethoxyphenyl)propane, ethylene oxide, propylene oxide and the like.

As the monomer (B) copolymerizable with the unsaturated polyester (A), mention may be made of alkenyl aromatic monomer such as styrene, α-methylstyrene, t-butylstyrene, and an alkylester of acrylic acid and methacrylic acid, and styrene is particularly preferable. The component (B) serves to cure the polyester through the reaction therewith. If it is less than 28% by weight, it is quantitatively insufficient to fully perform the curing, resulting in unsatisfactorily increased hardness. Thus, it is not practically adopted. On the other hand, if it exceeds 60% by weight, there remains the component (B) which has not participated in the reaction, thereby causing the reduction in the mechanical strength and surface contamination.

The block copolymer mixture (C) may be easily produced by using polymeric peroxide represented by the general formula (I) according to the publicly known manufacturing process such as the bulk polymerization method, the suspension polymerization method, the emulsion polymerization method, the solution polymerization method and the like. In this case, the polymer produced in the first polymerization reaction and which has the peroxy bonds in its molecule may be taken out from the reaction system as an intermediate to be used as a raw material of the succeeding block copolymer mixture, or in the alternative, it may be then block-polymerized without being taken out from the reaction system. Further, it is preferable that the use amount of the polymeric peroxide is 0.1–10 parts by weight with respect to 100 parts by weight of the monomer (a) or the monomer (b), the polymerization temperature is 40°–90° C., and the polymerization time is 2–15 hours.

The polymeric peroxide used in the production of the block copolymer mixture (C) in the present invention may be easily produced by reacting the dibasic acid chloride and an alkali peroxide according to the ordinary method of producing the diacyl peroxide.

As the polymeric peroxide in the present invention represented by the general formula (I), mention may be specifically made of:

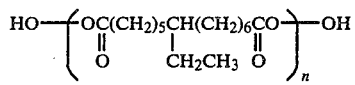

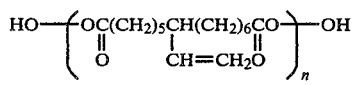

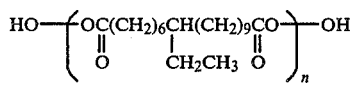

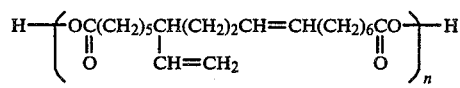

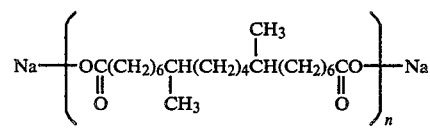

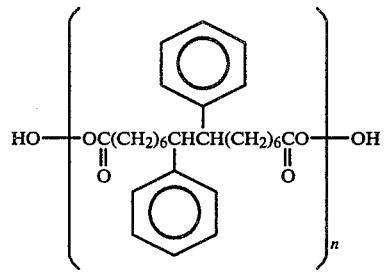

In all the above compounds, n is 2–40.

The monomer polymerizable with the styrene monomer as used in the production of the block copolymer mixture (C) in the present invention, mention may be made of acrylic acid, acrylic acid ester, methacrylic acid, methacrylic acid ester, a styrene derivative, acrylonitrile, methacrylonitrile, fumaric acid, a maleic acid derivative, vinyl ketone, vinyl pyridine, butadiene and the like. The use amount thereof is restricted to not higher than 30% by weight in monomer mixture with the styrene monomer.

If the use amount exceeds 30% by weight, the performance of the finally synthesized block copolymer mixture (C) is adversely affected, and if the unsaturated polyester resin composition containing such a block copolymer mixture (C) is cured, the glossiness of the surface of the cured product becomes insufficient and the pigmentation becomes poor.

As the monomer polymerizable with the $C_{1-4}$ alkyl ester of acrylic acid or methacrylic acid, mention may be made of a $C_{5-18}$ alkyl ester of acrylic acid or methacrylic acid, acrylic acid, methacrylic acid. The use amount thereof is restricted to not higher than 30% by weight in the monomer mixture consisting of the $C_{1-4}$ alkyl ester of acrylic acid or methacrylic acid. If the use amount exceeds 30% by weight, the performance of the finally synthesized block copolymer mixture (C) is adversely affected. Further, if the unsaturated polyester resin composition containing such a block copolymer mixture (C) is cured, rising of the block copolymer mixture is observed on the midway of the curing to cause ununiformity of the cure shrinkage.

The ratio between the monomer (a) and the monomer (b) used in the production of the block copolymer mixture (C) is preferably that the monomer (a) is 10–90 parts by weight, and the monomer (b) is 90–10 parts by weight. If the ratio is out of this range, and the monomer is converted into the unsaturated polyester resin composition, it is undesirably likely that the layer separation is developed between the unsaturated polyester and the block copolymer mixture (C) before or during the curing to cause ununiformity of the cured product.

The compounding amount of the block copolymer mixture (C) in the present invention is required to be 2–20% by weight with respect to the total amount of the above unsaturated polyester (A), the monomer (B) and the block copolymer mixture (C).

If the compounding amount is less than 2% by weight, no shrink-resistant effect can be obtained. If it exceeds 20% by weight, the expansion in curing becomes too larger, so that the mechanical strength of the cured molding is lowered.

Although the unsaturated polyester resin composition having the above-detailed composition may be used for various purposes as it is, it may be also effectively used as a resin mortar composition or a resin concrete composition in which a fine powder (for instance, inorganic or organic fine powder such as calcium carbonate, talc, clay, wood powder and the like), an aggregate (for instance, inorganic granular substance such as sand, gravel, crushed stone and the like) and so on are appropriately compounded. It is excellent in the storage stability in that even when it is left for a few or several days, a resin-rich layer is not produced and only a few amount of the fine powder and the aggregate is precipitated, and when the composition is cured according to the conventional procedure, the cured molding excellent in a dimensional accuracy with an uniform composition can be obtained under the cold curing conditions at 10° C.–30° C. for 10 minutes—10 hours.

That is, the low shrinkable unsaturated polyester resin composition according to the present invention is a composition in which the non-aqueous dispersion state stably dispersing the specific block copolymer mixture (C) therein in a micro state can be maintained for an extremely long period of time, and it has the merit that a high curing temperature is not always necessary for the composition to develop the shrink-resistant effect. Owing to this merit, it becomes possible to obtain the molding having a higher strength, more excellent dimensional accuracy, and a more excellent surface glossiness as compared with moldings obtained by the conventional molding methods adopting the cold curing. Furthermore, it is natural that when the composition is cured at a sufficient high temperature, larger shrink-resistant effect can be obtained. Extremely large dimensional accuracy, strength, glossiness and surface smoothness can be imparted upon the cured molding according to the heating molding method using SMC, BMC or the like as the composition for molding.

In the following, the invention will be explained more in detail with referring to Reference Examples, Examples and Comparative Examples which are merely given for the illustration of the invention but never interpreted to limit the scope of the invention. In Reference Examples, Examples and Comparative Examples, "part" and "%" mean "parts by weight" and "% by weight", respectively if otherwise specified.

REFERENCE EXAMPLE 1 (PRODUCTION OF POLYMERIC PEROXIDE)

Production of:

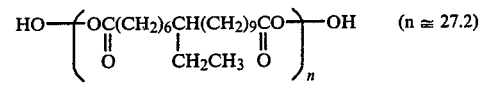

($n \approx 27.2$)

137 parts of 7% aqueous solution of sodium hydroxide and 8.2 parts of 50% aqueous solution of hydrogen peroxide were mixed together in a four neck flask equipped with a stirrer and a thermometer to prepare an aqueous solution of sodium peroxide.

Next, a solution in which 40 parts of toluene was added into 38 parts of 7-ethyl-hexadecane-1,16-dicarboxylic acid chloride (purity: 99%) was added thereto little by little at a temperature of 0°–5° C. under stirring. After being stirred at this temperature for 30 minutes, the solution was neutralized up to pH 7 with dilute hydrochloric acid. Then, an oily layer was taken out, washed twice with water, and dried over anhydrous magnesium sulfate. After a solid matter was removed through filtration, toluene was distilled off under a reduced pressure to obtain 29 parts of a transparent tacky liquid.

The amount of active oxygen of the thus obtained tacky liquid was determined to be 4.28% according to the ordinary iodine titration method.

It was confirmed from the characteristic absorption wavelength in the infrared absorption spectrum and the $\tau$ value and the strength of the nuclear magnetic resonance spetra that this tacky liquid was diacyl type polymeric peroxide having the following structural formula:

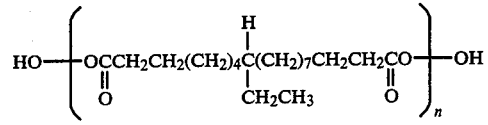

When measured by the ordinary VPO method, the average molecular weight of this polymeric peroxide was 9280.

REFERENCE EXAMPLE 2 (PRODUCTION OF A BLOCK COPOLYMER MIXTURE-1)

Into a glass reactor equipped with a thermometer, a stirrer and a condenser were charged 300 parts of 1.0% aqueous solution of polyvinyl alcohol and a solution in which 0.5 part of polymeric peroxide (hereinafter abbreviated as P·PO) obtained in Reference Example 1 had been dissolved into 10 parts of methyl methacrylate (hereinafter abbreviated as MMA). After air in the reactor was replaced by nitrogen gas, the temperature of the reaction system was raised up to 65° C. under heating to initiate the polymerization. The polymerization was carried out for 1.5 hours while the temperature being maintained at 65° C., and 90 parts of styrene (hereinafter abbreviated as ST) was added thereto. Then, after the temperature was raised up to 75° C., the polymerization was continued for 12 hours. Subsequently, the reaction mixture was cooled to room temperature to terminate the polymerization, and the polymer was filtered out, well washed with water, and dried under vacuum to obtain 97 parts of a white granular block copolymer mixture.

REFERENCE EXAMPLE 3 (PRODUCTION OF A BLOCK COPOLYMER MIXTURE-2)

97 parts of a block copolymer mixture was obtained according to Reference Example 2 except that a solution in which 2.5 parts of P·PO obtained in Reference Example 1 was dissolved into 50 parts of MMA and 50 parts of ST were used.

REFERENCE EXAMPLES 4 (PRODUCTION OF A BLOCK COPOLYMER MIXTURE-3)

96 parts of a block copolymer mixture was obtained according to Reference Example 2 except that a solution in which 4.5 parts of P·PO obtained in Reference Example 1 was dissolved into 90 parts of MMA and 10 parts of ST were used.

REFERENCE EXAMPLE 5 (PRODUCTION OF A BLOCK COPOLYMER MIXTURE-4)

After a solution in which 0.5 part of P·PO obtained in Reference Example 1 was dissolved into 10 parts of MMA was subjected to the polymerization, 95 parts of a block copolymer mixture was obtained according to Reference Example 2 except that a mixture of 63 parts of ST and 27 parts of methacrylic acid (hereinafter abbreviated as MA) was used.

REFERENCE EXAMPLE 6 (PRODUCTION OF A BLOCK COPOLYMER MIXTURE-5)

After a solution into which 6 parts of P·PO obtained in Reference Example 1 had been dissolved into 63 parts of MMA and 27 parts of acrylic acid (hereinafter abbreviated as AA) was subjected to the polymerization, 94 parts of a block copolymer mixture was obtained according to Reference Example 2 except that 10 parts of ST was used.

REFERENCE EXAMPLE 7 (PRODUCTION OF A BLOCK COPOLYMER MIXTURE-6)

After a solution in which 4.5 parts of P·PO obtained in Reference Example 1 had been dissolved into 35 parts of MMA and 15 parts of AA was subjected to the polymerization, 93 parts of a block copolymer mixture was obtained according to Reference Example 2 except that 35 parts of ST and 15 parts of MA were used.

REFERENCE EXAMPLE 8 (PRODUCTION OF A BLOCK COPOLYMER MIXTURE-7)

96 parts of a block copolymer mixture was obtained according to Reference Example 2 except that a solution dissolving into 50 parts of butyl acrylate (hereinafter abbreviated as BA) 1 part of P·PO represented by:

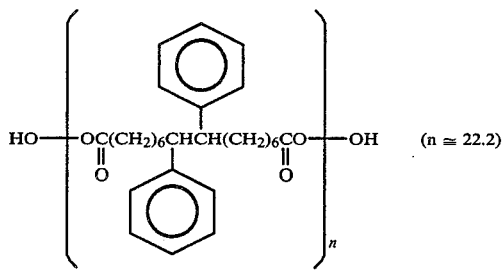

and 50 parts of ST were used.

Next, after 2.0 g of each of the block copolymer mixtures obtained in Reference Examples 2–8 was sampled, extraction was performed first with cyclohexane for 24 hours, and then with acetonitrile for 24 hours by using a Soxhlet apparatus.

The reduced weights in the cyclohexane extraction and the acetonitrile extraction were taken as the contents of polystyrene (hereinafter abbreviated as PST), and polymethacrylate (hereinafter abbreviated as PMMA) or butyl polyacrylate (hereinafter abbreviated as PBA) respectively, and the extraction residue was taken as the content of the block copolymer. Results thus obtained are shown in Table 1.

TABLE 1

| Reference Example No. | Charged amount (part) | | | | | | Composition of block copolymer mixture (%) | | | |
|---|---|---|---|---|---|---|---|---|---|---|
| | P.PO | ST | MA | MMA | AA | BA | PST | PMMA | PBA | Block copolymer |
| 2 | 0.5 | 90 | — | 10 | — | — | 9.0 | 2.0 | — | 89.0 |
| 3 | 2.5 | 50 | — | 50 | — | — | 9.6 | 5.7 | — | 84.7 |
| 4 | 4.5 | 10 | — | 90 | — | — | 2.5 | 12.0 | — | 85.5 |
| 5 | 0.5 | 63 | 27 | 10 | — | — | 8.3 | 1.3 | — | 90.4 |
| 6 | 6.0 | 10 | — | 63 | 27 | — | 1.5 | 12.7 | — | 85.8 |
| 7 | 4.5 | 35 | 15 | 35 | 15 | — | 1.9 | 9.5 | — | 88.6 |
| 8 | 1.0 | 50 | — | — | — | 50 | 10.0 | — | 6.8 | 83.2 |

REFERENCE EXAMPLE 9 (PRODUCTION OF AN UNSATURATED POLYESTER RESIN)

An unsaturated polyester (acidic value 30; hereinafter abbreviated as UP) was synthesized by esterifying 812 parts of fumaric acid, 498 parts of isophthalic acid, 396 parts of propylene glycol and 542 parts of neopentyl glycol according to the ordinary method, and the obtained UP was diluted with ST so that the concentration of ST may be 35% in the whole solution, thereby obtaining the unsaturated polyester resin (hereinafter abbreviated as UPR).

REFERENCE EXAMPLE 10 (PRODUCTION OF A BLOCK COPOLYMER MIXTURE FOR COMPARISON-1)

Into a glass reactor equipped with a thermometer, a stirrer and a condenser were charged 300 parts of 1.0% aqueous solution of polyvinyl alcohol and a solution produced by dissolving 0.5 part of P·PO obtained in Reference Example 1 into 10 parts of vinyl acetate (hereinafter abbreviated as VAc). After air in the reactor was replaced with nitrogen gas, the reaction system was heated up to 60° C. under stirring to initiate the polymerization. While the content of the reactor was maintained at a temperature of 60° C., the polymerization was carried out for 3 hours. Then, a mixture of 90 parts of ST and 10 parts of MA was added thereto.

Next, the temperature of the reaction system was raised up to 75° C., and the polymerization was continued for 7 hours. The reaction mixture was cooled to room temperature to terminate the polymerization, and the polymer was filtered out, well washed with water, and dried under vacuum to obtain 103 parts of a white granular block copolymer mixture.

REFERENCE EXAMPLE 11 (PRODUCTION OF A BLOCK COPOLYMER MIXTURE FOR COMPARISON-2)

98 parts of a block copolymer mixture was obtained according to Reference Example 10 except that a solution in which 2.5 parts of P·PO obtained in Reference Example 1 was dissolved into 50 parts of VAc was used and then a mixture of 50 parts of ST and 1.5 parts of MA was used.

Next, after 2 g of each of the block copolymer mixtures obtained in Reference Examples 10-11 was sampled, the copolymer mixture thus sampled was extracted first with methanol for 24 hours and then with cyclohexane for 24 hours by using a Soxhlet apparatus. The reduced weights of the copolymer mixture due to the extraction with methanol and cyclohexane were taken as the contents of polyvinyl acetate (hereinafter abbreviated as PVAc) and PST respectively, and the extraction residue was taken as the content of the block copolymer. Results thereof are shown in Table 2.

TABLE 2

| Reference Example No. | Composition of block copolymer mixture for comparison | | | | | | |
|---|---|---|---|---|---|---|---|
| | Charged amount (part) | | | | Composition of block copolymer mixture (%) | | |
| | P·PO | VAc | ST | MA | PST | PVAc | Block copolymer |
| 10 | 0.5 | 10 | 90 | 10 | 9.6 | 1.6 | 88.8 |
| 11 | 2.5 | 50 | 50 | 1.5 | 8.2 | 6.4 | 85.4 |

REFERENCE EXAMPLE 12 (PREPARATION OF A SHRINK-RESISTANT AGENT FOR COMPARISON)

(a) PVAc:
PVAc having a molecular weight of about 103,000 was dissolved into ST to be at the concentration of 30%, thereby obtaining a solution as a shrink-resistant agent (a).

(b) PMMA:
PMMA having a molecular weight of about 500,000 was dissolved into ST to be at the concentration of 30%, thereby obtaining a solution as a shrink-resistant agent (b).

(c) PST:
Stailon 666 made by Asahi Dow Industries Co., Ltd. was dissolved into ST to be at the concentration of 30%, thereby obtaining a solution as a shrink-resistant agent (c).

(d) ST-MMA random copolymer:
A random copolymer of ST and MMA having the weight ratio of 50:50 and the molecular weight of about 500,000 was dissolved into ST to be at the concentration of 30%, thereby obtaining a solution as a shrink-resistant agent (d).

The block copolymer mixture obtained in Reference Examples 2-8, 10 and 11 were used in the below-mentioned Examples as a dispersion liquid in which the block copolymer mixture was dispersed into ST at the concentration of 30%.

EXAMPLE 1 (SHRINK-RESISTANT EFFECT OF THE UNSATURATED POLYESTER RESIN COMPOSITION IN ORDINARY TEMPERATURE-WATER BATH SYSTEM)

The ST dispersion liquid of the block copolymer mixture obtained in Reference Example 2, and the UPR obtained in Reference Example 9 were mixed under the coexistence of the polymerization catalyst Permek N (made by Nippon Oil & Fats Company, Limited; a trade name of methylethyl ketone peroxide) and a polymerization promoter, cobalt naphthenate. Then, the mixture thus obtained was poured into a glass tube having a known volume, which was stationarily placed into a water bath of 20° C. The volume shrinkage of the cured product was determined by the following formula:

$$\text{Volume shrinkage (\%)} = \frac{\text{(Volume before curing)} - \text{(Volume after curing)}}{\text{Volume before curing}} \times 100$$

The temperature change of the composition poured into the glass tube was measured during the pouring-curing stage, but no temperature rise was observed due to a large heat removing effect of the water bath. Results are shown in Table 3.

EXAMPLES 2-14 REFERENCE EXAMPLES 12-16, SHRINK-RESISTANT EFFECT OF AN UNSATURATED POLYESTER RESIN COMPOSITION AND VINYL ESTER RESIN COMPOSITION IN ORDINARY TEMPERATURE-WATER BATH SYSTEM

Tests were conducted according to Example 1 by using each of the block copolymer mixtures obtained in Reference Examples 2-8, and results are shown in Table 3.

In Table 3, note is to be taken that the total amount of ST contained in the UPR and the ST dispersion liquid in the ultraleft column is substantially equal to the amount of the monomer B (ST) in the third column from the left.

TABLE 3

| | Volume shrinkage of cured product | | | | | | | |
|---|---|---|---|---|---|---|---|---|
| | (Unsaturated polyester resin UPR (part)) (ST dispersion liquid of block copolymer mixture (part)) | Unsaturated polyester (A) UP (%) | Monomer (B) ST (%) | Block copolymer mixture | | Cobalt naphthenate (part) | Permek[2] N (Part) | Volume shrinkage (%) | Curing time (hr.) |
| | | | | (%) | Kind | | | | |
| Example No. | | | | | | | | | |
| 1 | 94/6 | 61 | 37 | 2 | Reference Example 2 | 0.3 | 1.0 | 8.52 | 7 |
| 2 | " | " | " | " | Reference | " | " | 8.05 | " |

TABLE 3-continued

| | (Unsaturated polyester resin UPR (part)) (ST dispersion liquid of block copolymer mixture (part)) | Volume shrinkage of cured product | | | | | | | |
|---|---|---|---|---|---|---|---|---|---|
| | | Unsaturated polyester (A) UP (%) | Monomer (B) ST (%) | Block copolymer mixture (%) | Block copolymer mixture Kind | Cobalt naphthenate (part) | Permek[2] N (Part) | Volume shrink- age (%) | Curing time (hr.) |
| 3 | 83/17 | 54 | 41 | 5 | Reference Example 3 | 0.5 | 1.0 | 6.57 | 6 |
| 4 | " | " | " | " | Reference Example 5 | " | " | 6.51 | " |
| 5 | " | " | " | " | Reference Example 7 | " | " | 6.47 | " |
| 6 | 68/32 | 45 | 45 | 10 | Reference Example 2 | 0.5 | 1.5 | 4.28 | 7 |
| 7 | " | " | " | " | Reference Example 3 | " | " | 4.21 | " |
| 8 | 50/50 | 32 | 53 | 15 | Reference Example 4 | 0.5 | 1.0 | 2.02 | 8 |
| 9 | " | " | " | " | Reference Example 7 | " | " | 1.71 | " |
| 10 | " | " | " | " | Reference Example 8 | " | " | 1.54 | " |
| 11 | 34/66 | 22 | 58 | 20 | Reference Example 2 | 0.5 | 1.5 | −3.49 | 7 |
| 12 | " | " | " | " | Reference Example 4 | " | " | −3.13 | " |
| 13 | " | " | " | " | Reference Example 6 | " | " | −3.56 | " |
| 14 | " | " | " | " | Reference Example 8 | " | " | −3.54 | " |
| Reference Example No. | | | | | | | | | |
| 12 | (VER-1[3]) 94/6 | | | 2 | Reference Example 2 | 0.5 | 1.5 | 7.6 | 7 |
| 13 | (VER-1[3]) 70/30 | | | 9 | Reference Example 2 | " | " | 3.2 | " |
| 14 | (VER-2[4]) 80/20 | | | 4 | Reference Example 4 | " | " | 3.8 | " |
| 15 | (VER-3[5]) 80/20 | | | 4 | Reference Example 5 | " | " | 3.4 | " |
| 16 | (VER-3[5]) 70/30 | | | 9 | Reference Example 7 | " | " | 2.9 | " |

[1]6% ST solution
[1] and [2] give the addition amounts with respect to 100 parts of the total amount of unsaturated polyester (A), monomer (B), block copolymer mixture (C)
[3]novolack type vinyl ester resin (made by Showa Kobunshi Co., Ltd., trade name: Lipoxy H-600)
[4]novolack type vinyl ester resin (made by Yupika Co., Ltd., trade name: Neopol 8411H)
[5]bisphenol type vinyl ester resin (made by Dow Chemical Co., Ltd., trade name: Derakeen 411-C-45)

COMPARATIVE EXAMPLES 1–14

Tests were conducted according to Example 1 except that the shrink-resistant agent prepared for comparison in Reference Example 12 was used, and results are shown in Table 4.

COMPARATIVE EXAMPLES 15–18

Tests were conducted according to Example 1 except that each of the ST dispersion liquids of the block copolymer mixtures prepared for comparison in Reference Examples 10 and 11 was used, and results are shown in Table 5.

TABLE 4

| | (Unsaturated polyester resin UPR (part)) (Low shrinkage agent for comparison (part)) | Volume shrinkage of cured product | | | | | | | |
|---|---|---|---|---|---|---|---|---|---|
| | | Unsaturated polyester (A) UP (%) | Monomer (B) ST (%) | Shrink-resistant agent for comparison (%) | Shrink-resistant agent for comparison Kind | Cobalt naphthenate (part) | Permek N (part) | Volume shrink- age (%) | Curing time (hr.) |
| Comparative Example No. | | | | | | | | | |
| 1 | 83/17 | 54 | 41 | 5 | (a) | 0.5 | 1.5 | 10.43 | 7 |
| 2 | " | " | " | " | (b) | " | " | 10.30 | " |
| 3 | " | " | " | " | (c) | " | " | 1 — | — |
| 4 | " | " | " | " | (d) | " | " | 2 — | — |
| 5 | 50/50 | 32 | 53 | 15 | (a) | 0.5 | 1.0 | 10.41 | 8 |
| 6 | " | " | " | " | (b) | " | " | 10.39 | " |
| 7 | " | " | " | " | (d) | " | " | 3 — | — |
| 8 | 100/0 | 65 | 35 | | | 0.5 | 1.0 | 10.50 | 7 |
| Compara- | | | | | | | | | |

TABLE 4-continued

| (Unsaturated polyester resin UPR (part)) (Low shrinkage agent for comparison (part)) | Unsaturated polyester (A) UP (%) | Monomer (B) ST (%) | Shrink-resistant agent for comparison (%) | Shrink-resistant agent for comparison Kind | Cobalt naphthenate (part) | Permek N (part) | Volume shrink- (%) | Curing time (hr.) |
|---|---|---|---|---|---|---|---|---|
| tive Reference Example No. | | | | | | | | |
| 9 (VER-1) 70/30 | | | 9 | (b) | 0.5 | 1.5 | 4 — | 7 |
| 10 (VER-2) 70/30 | | | 9 | (c) | " | " | 5 — | " |
| 11 (VER-3) 70/30 | | | " | (d) | " | " | 6 — | " |
| 12 (VER-1) 100/0 | | | | | " | " | 8.7 | " |
| 13 (VER-2) 100/0 | | | | | " | " | 9.5 | " |
| 14 (VER-3) 100/0 | | | | | " | " | 11.5 | " |

[1,2,3,4,5,6] Layer separation gradually progressed until curing, and finally the material was completely divided into two layers of the lower layer of the cured material and the upper layer of the non-cured tacky material.

TABLE 5

| Comparative Example No. | (Unsaturated polyester resin UPR (part)) (ST dispersion liquid of block copolymer mixture for comparison (part)) | Unsaturated polyester (A) UP (%) | Monomer (B) ST (%) | Block copolymer mixture for comparison (%) | Block copolymer mixture for comparison Kind | Cobalt naphthenate (part) | Permek N (part) | Volume shrinkage (%) | Curing time (hr.) |
|---|---|---|---|---|---|---|---|---|---|
| 15 | 94/6 | 61 | 37 | 2 | Reference Example 10 | 0.5 | 1.0 | 9.23 | 7 |
| 16 | " | " | " | " | Reference Example 11 | " | " | 9.14 | " |
| 17 | 68/32 | 45 | 45 | 10 | Reference Example 10 | 0.5 | 1.2 | 6.54 | " |
| 18 | 34/66 | 22 | 58 | 20 | Reference Example 11 | 0.5 | 1.2 | 3.23 | " |

EXAMPLES 15 (SHRINK-RESISTANT EFFECT IN A RESIN MORTAR COMPOSITION)

80 parts of UPR obtained in Reference Example 9 and 20 parts of an ST dispersion liquid in which the block copolymer mixture obtained in Reference Example 2 was dispersed into ST to be at the concentration of 30% were mixed for 20 minutes by a labomixer (a high shear mixer), 1.0 part of Permek N and 0.3 part of cobalt naphthenate were added and mixed thereto. Then, 100 parts of a mixture of an aggregate and a filler (silica sand No. 3:silica sand No. 4:silica sand No. 7:calcium carbonate=2:1:1:1 at the weight ratio) was added and mixed into the thus obtained mixture to obtain a resin mortar composition. This composition was hardened at ordinary temperature for 2 hours, and the surface state after 7 day curing was observed, and the shrink-resistant effect was measured. As a result, neither cracking, nor deformation were observed in this cured product. At that time, the linear shrinkage factor was 0.006%.

COMPARATIVE EXAMPLE 19

Tests were conducted according to Example 15 except that the shrink-resistant agent (c) for comparison in Reference Example 12 was used instead of the ST dispersion liquid of the block copolymer mixture in Example 15. As a result, the surface of the cured product has a tackiness due to the separation of the PST, so that the shrinkage factor could not be measured.

EXAMPLE 16 (SHRINK-RESISTANT EFFECT ETC., OF A RESIN CONCRETE COMPOSITION)

After 80 parts of UPR obtained in Reference Example 9 and 20 parts of an ST dispersion liquid in which the block copolymer mixture obtained in Reference Example 2 was dispersed into ST to be at the concentration of 30% were mixed together by a labomixer for 20 minutes, 1.0 part of Permek N and 0.3 part of cobalt naphthenate were added and mixed thereinto. Then, 100 parts of calcium carbonate and 300 parts of river sand (the largest particle size of 5 mm) were mixed thereto to obtain a resin concrete composition. The thus obtained composition was poured into a mold having a vertical side of 1,000 mm, a lateral side of 100 mm and a height of 50 mm, and hardened at room temperature in 2 hours, and cured for 7 days, thereby obtaining a resin concrete having an excellent surface state. Results are shown in Table 6.

EXAMPLES 17-22 (SHRINK-RESISTANT EFFECT ETC., OF RESIN CONCRETE COMPOSITIONS)

Tests were conducted according to Example 21 except that the block copolymer mixtures obtained in Reference Examples 3-8 were used, and resin concrete compositions each having an excellent surface state was obtained. Results are shown in Table 6.

COMPARATIVE EXAMPLES 20-23

Although tests were conducted according to Example 21 except that the shrink-resistant agents (a)-(d) in Reference Example 12 were used, the surface-tacky property which seemed to be originated from the raising of the shrink-resistant agent. Results are shown in Table 6.

COMPARATIVE EXAMPLES 24–25

Tests were conducted according to Example 16 except that the block copolymer mixtures obtained for comparison in Reference Examples 10 and 11 were used, and resin concrete compositions each having an excellent surface state were obtained. Results are shown in Table 6.

COMPARATIVE EXAMPLE 26

Tests were conducted according to Example 21 except that an ST dispersion liquid of the block copolymer mixture was not added, thereby obtaining a resin concrete. The surface state was poor in that the surface was cracked. Results are shown in Table 6.

TABLE 6

| | Evaluation results of resin concretes | | |
|---|---|---|---|
| | Kind of shrink-resistant agent | Surface state | Linear shrinkage (%) |
| Example 16 | Block copolymer mixture of Reference Example 2 | o | −0.01 |
| Example 17 | Block copolymer mixture of Reference Example 3 | o | −0.01 |
| Example 18 | Block copolymer mixture of Reference Example 4 | o | 0.00 |
| Example 19 | Block copolymer mixture of Reference Example 5 | o | −0.02 |
| Example 20 | Block copolymer mixture of Reference Example 6 | o | 0.00 |
| Example 21 | Block copolymer mixture of Reference Example 7 | o | −0.01 |
| Example 22 | Block copolymer mixture of Reference Example 8 | o | −0.02 |
| Comparative Example 20 | PVAc (a) of Reference Example 12 | x Tacky surface | Measurement impossible |
| Comparative Example 21 | PMMA (b) of Reference Example 12 | x Tacky surface | Measurement impossible |
| Comparative Example 22 | PST (c) of Reference Example 12 | x Tacky surface | Measurement impossible |
| Comparative Example 23 | ST-MMA (d) of Reference Example 12 Random copolymer | x Tacky surface | Measurement impossible |
| Comparative Example 24 | Block copolymer mixture for comparison in Reference Example 10 | o | 0.02 |
| Comparative Example 25 | Block copolymer mixture for comparison in Reference Example 11 | o | 0.02 |
| Comparative Example 26 | No addition | x Cracks occurred | 0.20 |

[1]o: Good surface state
x: Cracks occurred or bad surface state due to the separation of the shrink-resistant agent, etc.

As obvious from the comparison between Examples and Comparative Examples, it is observed that when the block copolymer mixture adopted in the present invention is used as the shrink-resistant agent in the same amount as the commonly used shrink-resistant agent, the former gives a lower volume shrinkage as compared with the latter.

The resin concrete products were prepared by using the shrink-resistant agents in Examples of the invention and those in Comparative Examples, and the obtained products were compared together, so that the products of the invention were far more excellent in the surface state and the linear shrinkage factor that the comparative products.

What is claimed is:

1. A low shrinkable unsaturated polyester resin composition consisting of:
   (A) 20–70% by weight of an unsaturated polyester;
   (B) 28–60% by weight of a monomer polymerizable with the above unsaturated polyester;
   (C) 2–20% by weight of a block copolymer mixture, in which a mixture of the monomer (B) and the block copolymer mixture (C) is in a non-aqueous dispersion state, and a mixture of the polyester (A), the monomer (B) and the block copolymer mixture (C) is in a non-aqueous dispersion state, said block copolymer mixture is obtained by polymerizing either one of the monomers defined below in (a) and (b), with a polymerization initiator comprising a polymeric peroxide represented by the formula:

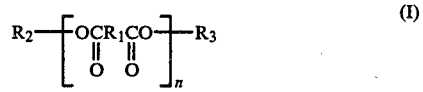

in which $R_1$ represents a divalent branched hydrocarbon group having 10–30 carbons, and $R_2$ and $R_3$ represent a hydrogen atom, a hydroxyl group or an alkali metal, and the average polymerization degree n is 2–40, to obtain a first polymer having peroxy bonds in its molecule, and block-polymerizing the first polymer with the remaining monomer (a) or (b), which was not been used in the first polymerization reaction, wherein
   (a) is a monomer or a monomer mixture consisting of 70–100% by weight of styrene monomer and 0–30% by weight of a monomer polymerizable therewith;
   (b) is a monomer or a mixture of monomers consisting of 70–100% by weight of $C_{1-4}$ alkyl ester of acrylic acid or methacrylic acid and up to 30% by weight of a monomer polyermizable therewith selected from the group consisting of $C_{5-18}$ alkyl ester of acrylic acid and methacrylic acid, acrylic acid, and methacrylic acid.

2. A low shrinkable unsaturated polyester resin composition according to claim 1, wherein the unsaturated polyester (A) is obtained by condensation polymerization of an $\alpha,\beta$-unsaturated dibasic acid, a saturated dibasic acid and a glycol.

3. A low shrinkable unsaturated polyester resin composition according to claim 2, wherein the $\alpha,\beta$-unsaturated dibasic acid is selected from the group consisting of maleic anhydride, maleic acid, fumaric acid, mesaconic acid, tetraconic acid, itaconic acid, chlorinated maleic acid, and an alkyl ester thereof;
   the saturated dibasic acid is selected from the group consisting of phthalic anhydride, phthalic acid, isophthalic acid, tetraphthalic acid, tetrahydrophthalic acid, halogenated phthalic anhydride, adipic acid, succinic acid, sebacic acid, and an alkyl ester thereof; and
   the glycol is selected from the group consisting of ethylene glycol, diethylene glycol, propylene glycol, dipropylene glycol, butylene glycol, neopentyl glycol, hexylene glycol, hydrogenated bisphenol A, 2,2'-di(4-hydroxypropoxyphenyl) propane, and 2,2'-di(3-hydroxyethoxyphenyl)propane.

4. A low shrinkable unsaturated polyester resin composition according to claim 1, wherein the monomer (B)

is selected from the group consisting of an alkenyl aromatic monomer, alkyl ester of acrylic acid and methacrylic acid.

5. A low shrinkable unsaturated polyester resin composition according to claim 4, wherein the alkenyl aromatic monomer is selected from the group consisting of styrene, α-methylstyrene and t-butylstyrene.

6. A low shrinkable unsaturated polyester resin composition according to claim 1, wherein the polymeric peroxide represented by the formula (I) is selected from the group consisting of:

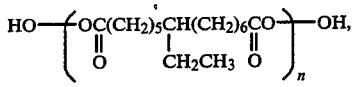

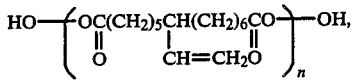

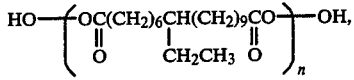

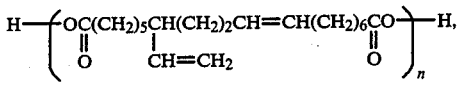

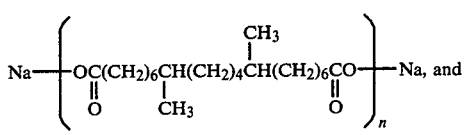

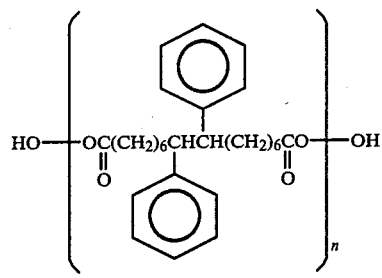

7. A low shrinkable unsaturated polyester resin composition according to claim 1, wherein the monomer polymerizable with the styrene monomer is selected from the group consisting of acrylic acid, acrylic acid ester, methacrylic acid, methacrylic acid ester, styrene derivative, acrylonitrile, methacrylonitrile, derivatives of fumaric acid and maleic acid, vinyl ketone, vinyl pyridine, and butadiene.

8. A low shrinkable unsaturated polyester resin composition according to claim 1, wherein the weight ratio between the monomer (a) and the monomer (b) in the block copolymer mixture is 90:10.

* * * * *